(12) United States Patent
Ohlsson

(10) Patent No.: US 11,792,693 B2
(45) Date of Patent: Oct. 17, 2023

(54) METHODS AND APPARATUSES FOR REDIRECTING USERS OF MULTIMEDIA PRIORITY SERVICES

(71) Applicant: Telefonaktiebolaget LM Ericsson (publ), Stockholm (SE)

(72) Inventor: Oscar Ohlsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/020,655

(22) PCT Filed: Feb. 8, 2022

(86) PCT No.: PCT/SE2022/050137
§ 371 (c)(1),
(2) Date: Feb. 10, 2023

(87) PCT Pub. No.: WO2022/235181
PCT Pub. Date: Nov. 10, 2022

(65) Prior Publication Data
US 2023/0217320 A1    Jul. 6, 2023

Related U.S. Application Data

(60) Provisional application No. 63/183,792, filed on May 4, 2021.

(51) Int. Cl.
*H04W 36/00* (2009.01)
*H04W 76/27* (2018.01)
*H04W 88/06* (2009.01)

(52) U.S. Cl.
CPC .... *H04W 36/0011* (2013.01); *H04W 36/0022* (2013.01); *H04W 36/0033* (2013.01); *H04W 76/27* (2018.02); *H04W 88/06* (2013.01)

(58) Field of Classification Search
CPC . H04W 36/14; H04W 36/0022; H04W 76/27; H04W 76/10; H04W 76/11; H04W 72/56; H04W 76/30; H04W 76/19
See application file for complete search history.

(56) References Cited

U.S. PATENT DOCUMENTS 5,862,485 A    1/1999    Linneweh et al.

FOREIGN PATENT DOCUMENTS

EP    1686752 A1    8/2006

OTHER PUBLICATIONS

"3rd Generation Partnership Project; Technical Specification Group Core Network and Terminals; Non-Access-Stratum (NAS) protocol for 5G System (5GS); Stage 3; (Release 17)", 3GPP TS 24.501 V17.2.1 (Apr. 2021), Apr. 2021, 757 pages.

(Continued)

*Primary Examiner* — Nam T Huynh
(74) *Attorney, Agent, or Firm* — Murphy, Bilak & Homiller, PLLC

(57) ABSTRACT

A method according to a first example embodiment is performed by a user equipment, UE, in connection with a first network node in a first cell. The method comprises: receiving (202) a first request from the first network node in the first cell redirecting the UE to an indicated carrier or radio access technology, RAT. The first request comprises: an indication that the UE should enter an inactive state, and an indication that the first request relates to a Multimedia Priority Services, MPS, session. The method further comprises, responsive to receiving the first request: entering (204) an inactive state; selecting (206) a second cell on the indicated carrier or RAT; and resuming (208) a connection for the MPS session on the second cell. The connection is resumed with priority.

6 Claims, 11 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.4.0, Mar. 2021, 1087 pages.

"3rd Generation Partnership Project; Technical Specification Group Radio Access Network; NR; Radio Resource Control (RRC) protocol specification (Release 16)", 3GPP TS 38.331 V16.4.1, Mar. 2021, 949 pages.

"Redirection with MP3 Indication", 3GPP TSG-RAN WG2 Meeting # 113bis-e, R2-2104635, Perspecta Labs, CISA ECD, T-Mobile US, Ericsson, Qualcomm, NTT DoCoMo, E-Meeting, Apr. 12-20, 2021, 10 pages.

"Redirection with MP3 Indication", 3GPP TSG-RAN WG2 Meeting # 113bis-e, R2-2104634, Perspecta Labs, CISA ECD, T-Mobile US, Ericsson , Qualcomm, NTT DoCoMo, E-Meeting, Apr. 12-20, 2021, 17 pages.

302

Transmit a first request to the UE redirecting the UE to an indicated carrier or radio access technology, RAT, wherein the first request comprises: an indication that the UE should enter an inactive state, and an indication that first request relates to an MPS session

FIG. 3

METHODS AND APPARATUSES FOR REDIRECTING USERS OF MULTIMEDIA PRIORITY SERVICES

TECHNICAL FIELD

Embodiments of the disclosure relate to communications, and particularly to methods and apparatuses for redirecting users of Multimedia Priority Services.

BACKGROUND

Public safety communication over commercial networks

In emergency situations (e.g., floods, hurricanes, earthquakes, terrorist attacks) where human life and other values are at risk, reliable communication between public safety personnel may be essential to avoid or at least mitigate damage.

Traditionally, public safety organizations have relied on specialized systems based on private narrowband radio access networks for their communication needs such as Terrestrial Trunked Radio (TETRA) or P25. Since building and operating such networks is complex and costly many countries are investigating how to use 4G (and in the future 5G and 6G etc.) networks for their public safety communications. Using networks based on 3GPP technology not only brings down the network cost, but also enables cheaper devices and more rapid evolution of features thanks to the economies of scale. 4G or 5G networks can also provide better data transport capabilities and increased capacity compared to the private narrowband networks.

When deploying a public safety network there are several alternatives that can be considered:
  Standalone deployment
  Sharing with commercial networks In the first model the public agency deploys a full network covering the service area the agency is responsible for. The spectrum needed for this deployment may also need be reserved with the responsible authority. While this model is attractive in that the public agency is in complete control over the network, it is also very costly and involves large investment and operating costs.

To reduce network costs the second model has recently gained increased interest. This model also makes it possible to provide nation-wide coverage from day one. The downside is that the network resources are shared by public safety and regular users, which means mechanisms to prioritize the public safety users need to be provided. There may be various degrees of sharing: either both radio access network and core network can be shared or only radio access network is shared, and the public safety agency uses its own dedicated core network.

Multimedia Priority Services (MPS)

Multimedia Priority Services (MPS) is a feature in 5G which allows public safety users to make priority calls/sessions using commercial networks in situations such as during congestion. MPS is used in the shared deployment model, or when the private network is unavailable, for example due to congestion or partial network infrastructure outages, perhaps due to a direct or indirect result of the emergency situation.

Public safety users authorized to use MPS are called Service Users in the 3GPP specifications. A Service User can either use a user equipment (UE) with an MPS subscription or a UE without an MPS subscription (e.g., the Service User borrows a UE that does not have an MPS subscription).

A UE can be in an MPS session in 5G in one of the following three ways:
  A Service User using a UE with an MPS subscription may initiate a mobile originating MPS call. In this case the UE obtains priority access to the network by using the Unified Access Control (UAC) mechanism and the special MPS Access Identity (AI=1). The MPS Access Identity entitles the UE to be exempted from access barring and to use the special MPS establishment cause (mps-PriorityAccess in case of NR and highPriorityAccess in case of LTE/5GC).
  A Service User using a UE without an MPS subscription may initiate a mobile originating MPS call. In this case the UE will not obtain priority during the initial access to network, only after MPS is established for the session.
  A UE receives an incoming MPS call from a Service User. If the UE does not have an MPS subscription it will not obtain priority during the initial access to network, only after MPS is established for the session.

Redirection of MPS Calls

In all the cases above it may be that the serving cell does not support MPS and thus the network may need to redirect or handover the UE to a cell on another carrier/RAT. In case of redirect the UE releases the connection and then selects a new cell on the indicated carrier/RAT where it will establish a new connection. To ensure that UEs without an MPS subscription (e.g. the UE in case 2 and 3 above) can establish the new connection with priority it has been proposed in 3GPP (see, for example, R2-2104634, Redirection with MPS Indication (CR to 36.331), RAN2 #113bis-e; and R2-2104635, Redirection with MPS Indication (CR to 38.331), RAN2 #113bis-e) to include an MPS indication in the release with redirect message. When receiving this indication the UE is allowed to skip the access barring check and use the MPS establishment cause similar to MPS subscribed UEs. This is illustrated in FIG. 1 for the case of redirect from NR to NR. The other cases (NR to LTE/5GC, LTE/5GC to NR, and LTE/5GC to 5GC) are similar.

SUMMARY

There currently exist certain challenge(s). The current solution illustrated in FIG. 1 requires a large number of messages to be exchanged between the UE and the network, which leads to long interruption/waiting times.

Certain aspects of the disclosure and their embodiments may provide solutions to these or other challenges.

To minimize the interruption when releasing and redirecting a UE for MPS it would be beneficial if the UE is released to inactive state rather than idle state (in the following, this release may be referred to as "inactive release with redirect"). When a UE is released to inactive state the UE context is maintained in the network and in the UE which means establishing the connection in the new cell after the redirect will be faster compared to when the UE is released to idle state. However, the MPS priority indication is currently only possible to use when a UE is released to idle state. Hence if the UE is released to inactive state and redirected to another carrier/RAT the network cannot include the MPS priority indication which means the UE would not establish the new connection in the target cell with priority (i.e. the UE would be subject to access barring and would be using the a non-prioritized establishment cause (e.g. moSignalling)).

A first aspect of the disclosure provides a method performed by a user equipment (UE) in connection with a first network node in a first cell. The method comprises: receiving a first request from the first network node in the first cell redirecting the UE to an indicated carrier or radio access technology (RAT). The first request comprises: an indication that the UE should enter an inactive state, and an indication that the first request relates to a Multimedia Priority Services (MPS) session. The method further comprises, responsive to receiving the first request: entering an inactive state; selecting a second cell on the indicated carrier or RAT; and resuming a connection for the MPS session on the second cell. The connection is resumed with priority.

Apparatus configured to perform the method according to the first aspect is also provided. For example, one aspect provides a UE. The UE comprises: processing circuitry configured to cause the user equipment to: receive a first request from a first network node in a first cell redirecting the UE to an indicated carrier or RAT. The UE is in connection with the first network node in the first cell. The first request comprises: an indication that the UE should enter an inactive state, and an indication that the first request relates to an MPS session. The processing circuitry is further configured to cause the UE to, responsive to receiving the first request: enter an inactive state; select a second cell on the indicated carrier or RAT; and resume a connection for the MPS session on the second cell. The connection is resumed with priority.

Another aspect of the disclosure provides a method performed by a first network node in a first cell. The first network node is in connection with a UE. The method comprises: transmitting a first request to the UE redirecting the UE to an indicated carrier or RAT. The first request comprises: an indication that the UE should enter an inactive state, and an indication that the first request relates to an MPS session.

Apparatus configured to perform the method according to the second aspect is also provided. For example, one aspect provides a first network node. The first network node comprises: processing circuitry configured to cause the first network node to: transmit a first request to the UE redirecting the UE to an indicated carrier or RAT. The first network node is in connection with a UE in a first cell. The first request comprises: an indication that the UE should enter an inactive state, and an indication that the first request relates to an MPS session.

A further aspect of the disclosure provides a method performed by a second network node for resuming a connection to a UE. The method comprises: receiving a second request from the UE (wherein the UE is in an inactive state) to resume the connection. The second request comprises an indication that the second request relates to a Multimedia Priority Services, MPS, session. The method further comprises prioritizing the connection responsive to the second request comprising the indication that second request relates to an MPS session.

Apparatus configured to perform the method according to the third aspect is also provided. For example, one aspect provides a second network node. The second network node comprises: processing circuitry configured to cause the second network node to: receive a second request from a UE (wherein the UE is in an inactive state) to resume a connection to the second network node. The second request comprises an indication that the second request relates to a Multimedia Priority Services, MPS, session. The processing circuitry is further configured to cause the second network node to prioritize the connection responsive to the second request comprising the indication that second request relates to an MPS session.

Embodiments described herein allow the MPS indication to be included also when doing inactive release with redirect. In this way the UE will be prioritized when it connects in the new cell and the connection establishment will be faster since the UE starts from inactive rather than idle state.

Certain embodiments may provide one or more of the following technical advantage(s). Embodiments described herein reduce the interruption time when a UE with a pending MPS call needs to be redirected to another carrier/RAT.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 3 illustrates a method in accordance with some embodiments;

DETAILED DESCRIPTION

Some of the embodiments contemplated herein will now be described more fully with reference to the accompanying drawings. Embodiments are provided by way of example to convey the scope of the subject matter to those skilled in the art.

Figure 2:
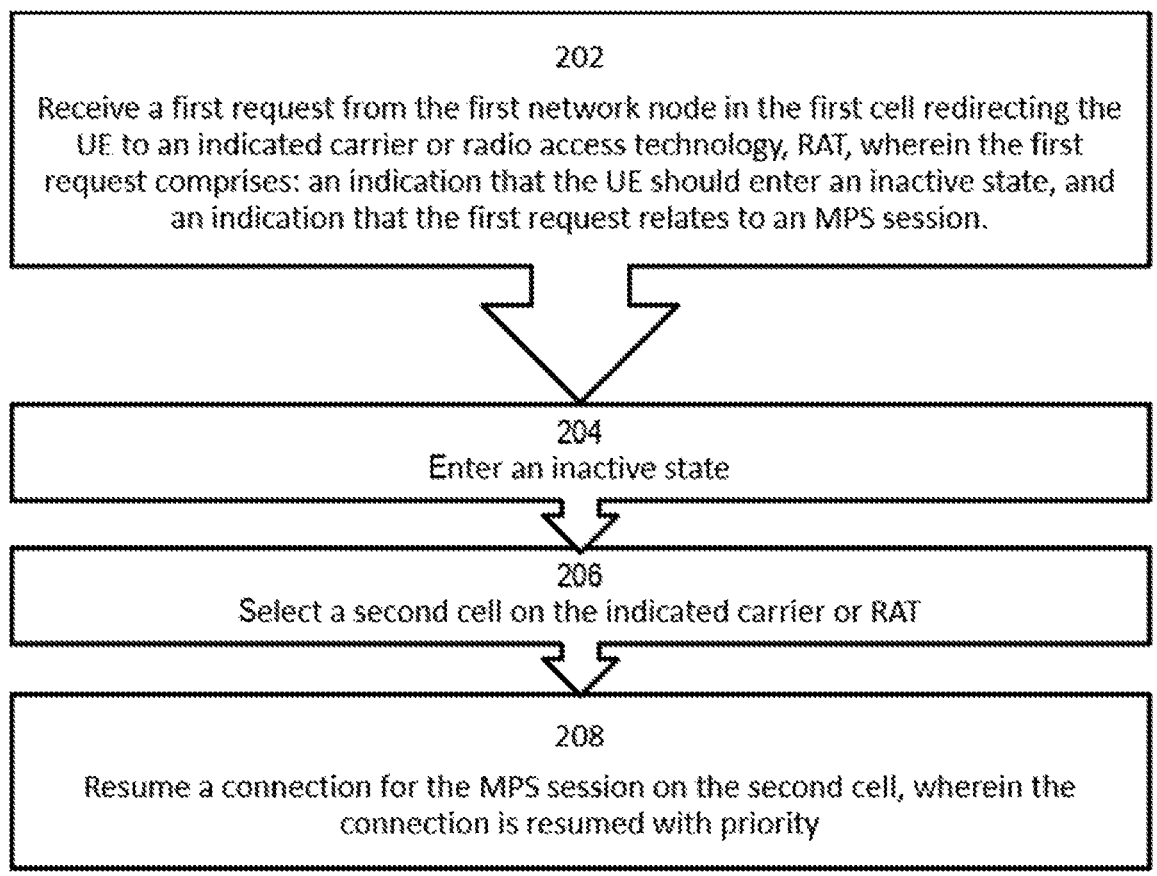
FIG. 2 illustrates a method in accordance with some embodiments.

FIG. 2 depicts a method in accordance with particular embodiments. The method described in FIG. 2 may be performed by a UE or wireless device (e.g. the UE 612 or UE 700 as described later with reference to FIGS. 6 and 7 respectively). The UE is in connection with a first network node in a first cell. The method begins at step 202 with receiving a first request from the first network node in the first cell redirecting the UE to an indicated carrier or radio access technology, RAT, wherein the first request comprises: an indication that the UE should enter an inactive state, and an indication that the first request relates to an MPS session.

Steps 204, 206 and 208 may be performed responsive to receiving the first request.

In step 204 the method comprises entering an inactive state. In step 206 the method comprises selecting a second cell on the indicated carrier or RAT. It will be appreciated that the indicated carrier or RAT may be different to the carrier or RAT of the first cell. In step 208 the method comprises resuming a connection for the MPS session on the second cell, wherein the connection is resumed with priority.

FIG. 3 depicts a method in accordance with particular embodiments. The method described with reference to FIG. 3 may be performed by a first network node (e.g. the network node 610 or network node 800 as described later with reference to FIGS. 6 and 8 respectively). The first network node is in a first cell and is in connection with a UE. The method begins at step 302 with transmitting a first request to the UE redirecting the UE to an indicated carrier or radio access technology, RAT, wherein the first request comprises: an indication that the UE should enter an inactive state, and an indication that first request relates to an MPS session.

Figure 4:
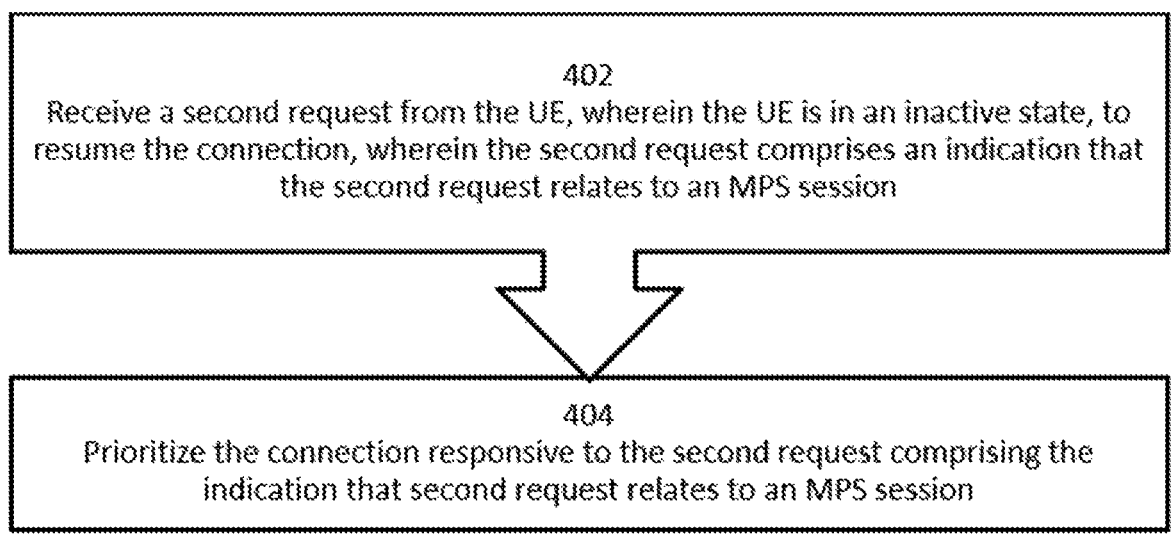
FIG. 4 illustrates a method in accordance with some embodiments.

FIG. 4 depicts a method in accordance with particular embodiments. The method described in FIG. 4 may be performed by a second network node (e.g. the network node 610 or network node 800 as described later with reference to FIGS. 6 and 8 respectively). The method of FIG. 4 may be for resuming a connection to a UE.

The method begins at step 402 with receiving a second request from the UE, wherein the UE is in an inactive state, to resume the connection, wherein the second request comprises an indication that the second request relates to an MPS session. In step 404 the method comprises prioritizing the connection responsive to the second request comprising the indication that second request relates to an MPS session. In some embodiments, steps 402 and 404 may correspond to parts of step 208 in FIG. 2.

Figure 5:
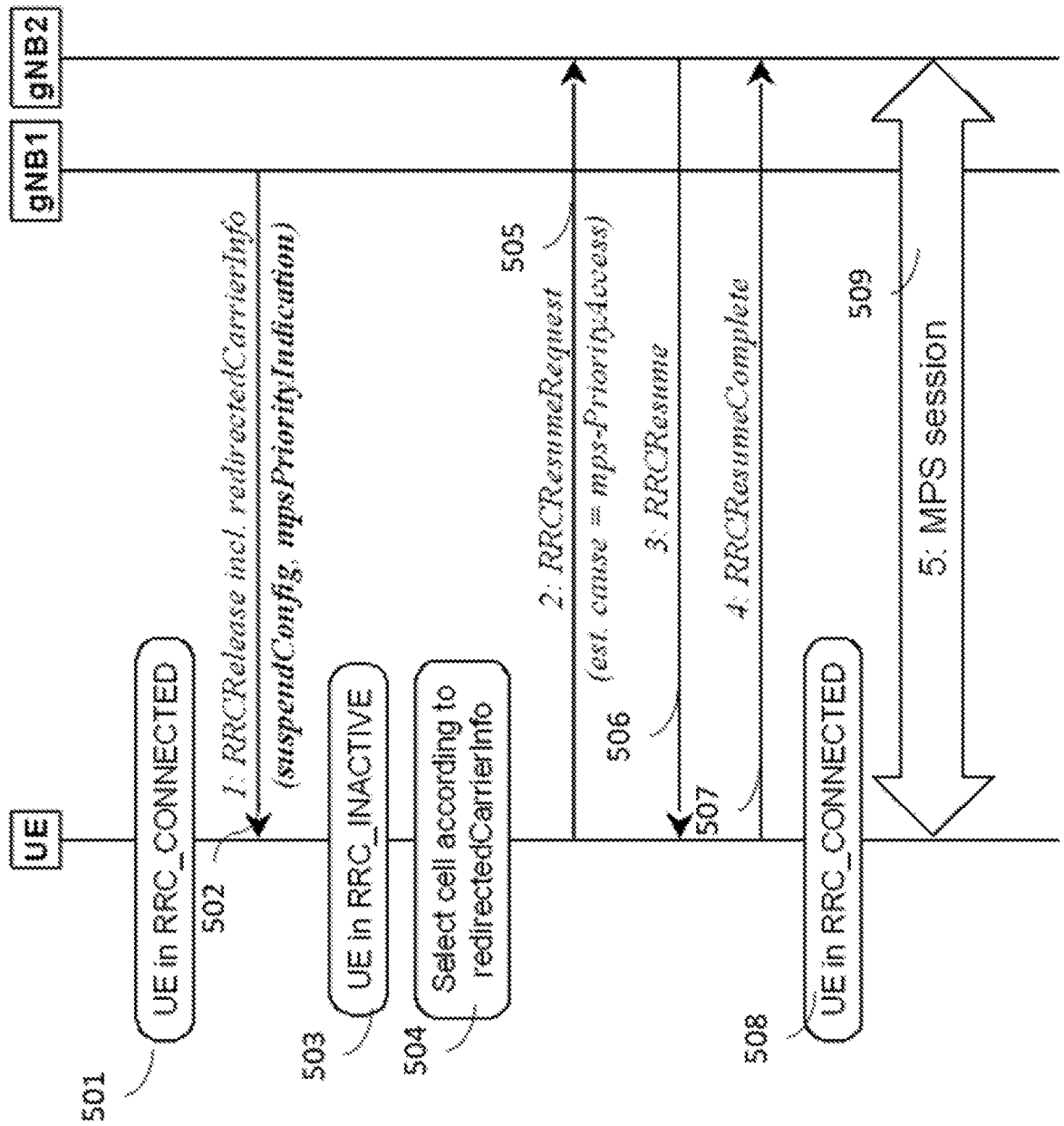
FIG. 5 a sequence diagram illustrating an example implementation of the methods of FIGS. 2, 3 and 4, in accordance with some embodiments.

FIG. 5 below is a sequence diagram illustrating an example implementation of the methods of FIGS. 2, 3 and 4.

This is example described with reference to a redirect from NR to NR but the basic steps are the same for the other cases (e.g. NR to LTE/5GC, LTE/5GC to NR, and LTE/5GC to 5GC). Some message and field names may differ between NR and LTE/5GC but in most cases the functionality is the same.

In step 501 the UE is in connected state and has a pending MPS call/session.

Since MPS is not supported in the current cell, in step 502 the network (e.g. the first network node gNB1) sends a release with redirect message to redirect the UE to another carrier/RAT. To speed up the connection establishment when the UE connects in the new cell, the network includes an indication that the UE should enter an inactive state (e.g. a suspend indication "suspendConfig"). The network also includes an indication that the first request relates to an MPS session (also referred to as an MPS priority indication e.g. "mpsPriorityIndication", or MPS indication) to indicate to the UE to establish the new connection with priority. Step 502 may correspond to step 202 of FIG. 2 and step 302 of FIG. 3.

In step 503, the UE, responsive to the release with redirect received in step 502, suspends the connection and enters inactive state. Step 503 may correspond to step 204 of FIG. 2.

In step 504, the UE selects a second cell on the indicated carrier/RAT (e.g. as indicated in "redirectedCarrierInfo"). Step 504 may correspond to step 206 of FIG. 2.

The UE then resumes a connection for the MPS session on the second cell, wherein the connection is resumed with priority.

The step of resuming the connection may comprise skipping an access barring step. Since the indication that the first request relates to an MPS session was included in the release with redirect message, the UE is aware that the redirect message is due to a pending MPS session and may therefore use the MPS Access Identity (AI=1) when performing access barring check in the new cell. For example, the UE may add the MPS access Identity to a set of access identities. The UE may then check if the MPS Access Identity is subject to access barring in a bitmap (e.g. uac-BarringForAccessIdentity bitmap) broadcasted in the second cell (for example, by performing this check for all of the set of access identities). The step of checking may be performed, for example, by checking what the bit corresponding to the MPS Access Identity in the bitmap is set to. Here it may be assumed that the bit corresponding to the MPS Access Identity is set to 0 which means the access barring check can be skipped, i.e. the connection attempt is considered allowed.

In step 505 the UE initiates resuming the connection by transmitting a second request (e.g. a resume request) to resume connection to a second network node (e.g. gNB2) belonging to the second cell, wherein the second request comprises an indication that second request relates to an MPS session. The indication that the second request relates to an MPS session may comprise an MPS establishment cause. Step 505 may correspond to step 402 of FIG. 4.

Since the redirect is for the purpose of MPS the UE may use the MPS establishment cause (mps-PriorityAccess in NR and highPriorityAccess in LTE/5GC) in the second request so that the connection will be prioritized by the network.

In step 506, the network (e.g. the second base station gNB2) accepts the connection resumption by sending a resume message to the UE and the UE responds in step 507 with a resume complete message. The UE is now in connected state (step 508).

In step 509 the MPS session starts, e.g. the UE starts exchanging MPS voice/video/data over one or more data radio bearers in the second cell.

Figure 1:
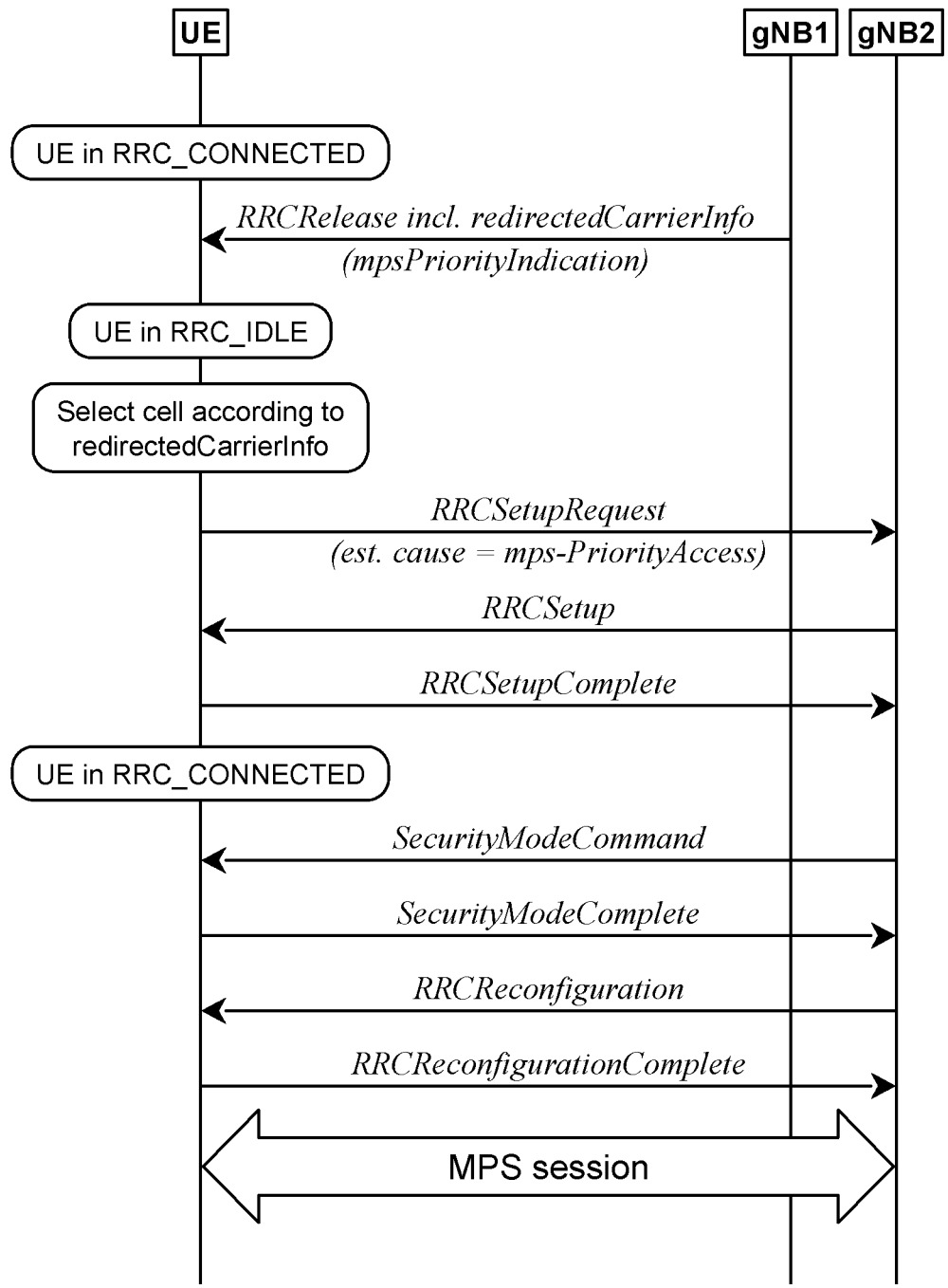
FIG. 1 illustrates a release of a UE with redirect where the release comprises an MPS indication.

By comparing the new redirect procedure in FIG. 5 with the existing/prior-art procedure in FIG. 1 it will be appreciated that fewer messages are exchanged between the UE and the network in the procedure of FIG. 5, which means the interruption/waiting time is shorter. Although not shown in FIG. 5, there is also typically a saving on the network side since fewer messages and/or less data need to be exchanged between the Radio Access Network and the Core Network when the connection is resumed compared to when a fresh connection is established.

A first example of how the methods of FIGS. 2 to 5 may be implemented in the NR RRC specification is shown below in "Example 1" (the underlined text is new). The UE may be logically divided into an access stratum (AS) layer and a non-access stratum (NAS) layer which are responsible for different functionality and different protocol layers. On a high level, the AS layer may be said to be responsible for the lower parts of the protocol stack (including e.g. RRC) that goes between the UE and the network node, while the NAS layer is responsible for the upper parts of the protocol stack that goes between the UE and the 5GC.

In this example it is assumed that the NAS layer triggers the AS layer to resume the connection. The NAS layer may be assumed to be unaware of the indication that the first request relates to an MPS session in the first request. This means the MPS Access Identity (AI=1) will not be among a set of Access Identities indicated from the NAS layer to the AS layer, but the AS layer may add the MPS Access Identity to the set of Access Identities itself. In other words, the AS layer in the UE may add the MPS access identity to the set of access identities, wherein the set of access identities is received at the AS layer from the NAS layer of the UE.

Note that the NAS layer also provides a so-called Access Category to the AS layer which is used in the access barring check; however, since the access barring check is assumed to be skipped for UE using the MPS Access Identity, the Access Category will not be further explained in this disclosure.

Example 1

"5.3.13 RRC Connection Resume
< ... >
5.3.13.2 Initiation
The UE initiates the procedure when upper layers or AS (when responding to RAN paging, upon triggering RNA updates while the UE is in RRC INACTIVE, or for sidelink communication as specified in sub-clause 5.3.13.1a) requests the resume of a suspended RRC connection.
The UE shall ensure having valid and up to date essential system information as specified in clause 5.2.2.2 before initiating this procedure.

(AI=1) to the set of Access Identities. In other words, in some embodiments the AS layer in the UE sends the indication that first request relates to an MPS session to the NAS layer of the UE; and responsive to receiving the indication that the MPS session is an MPS session, the NAS layer of the UE adds the MPS access identity to the set of access identities.

In this way the RRC connection resume procedure may not need to be updated since the MPS Access Identity is already included in the Access Identities that the UE AS layer receives from the NAS layer. The RRC release procedure may need to be updated though to inform NAS layer about the received indication that the first request relates to an MPS session.

Example 2

"5.3.8.3 Reception of the RRCRelease by the UE The UE shall:
< ... >
1>if the RRCRelease message includes mps-PriorityIndication:
   3>after the cell selection, forward the received cnType to upper layers;"

---

Upon initiation of the procedure, the UE shall:
  1> if the resumption of the RRC connection is triggered by response to NG-RAN paging:
    2> select '0' as the Access Category;
    2> perform the unified access control procedure as specified in 5.3.14 using the selected
       Access Category and one or more Access Identities provided by upper layers;
      3> if the access attempt is barred, the procedure ends;
  1> else if the resumption of the RRC connection is the result of a release with redirect with
    mpsPriorityIndication:
    2> if the upper layers provide an Access Category and one or more Access Identities:
      3> consider '1' to be among the Access Identities provided by upper layers;
      3> perform the unified access control procedure as specified in 5.3.14 using the
         Access Category and Access Identities provided by upper layers;
        4> if the access attempt is barred, the procedure ends;
    2> set the resumeCause to mps-PriorityAccess
  1> else if the resumption of the RRC connection is triggered by upper layers:
    2> if the upper layers provide an Access Category and one or more Access Identities:
      3> perform the unified access control procedure as specified in 5.3.14 using the
         Access Category and Access Identities provided by upper layers;
      3> perform the unified access control procedure as specified in 5.3.14 using the
         Access Category and Access Identities provided by upper layers;
        4> if the access attempt is barred, the procedure ends;
    2> set the resumeCause in accordance with the information received from upper layers;
  1> else if the resumption of the RRC connection is triggered due to an RNA update as
    specified in 5.3.13.8:
    2> if an emergency service is ongoing:
    NOTE: How the RRC layer in the UE is aware of an ongoing emergency service is up to
        UE implementation.
      3> select '2' as the Access Category;
      3> set the resumeCause to emergency;
    2> else:
      3> select '8' as the Access Category;
    2> perform the unified access control procedure as specified in 5.3.14 using the selected
       Access Category and one or more Access Identities to be applied as specified in TS
       24.501 [23];
      3> if the access attempt is barred:
        4> set the variable pendingRNA-Update to true;
        4> the procedure ends;
  <...>
  1> initiate transmission of the RRCResumeRequest message or RRCResumeRequest1 in
    accordance with 5.3.13.3."

---

A second example of how the methods of FIGS. 2 to 5 may be implemented in the NR RRC specification is shown below in "Example 2" (the underlined text is new).

Figure 6:
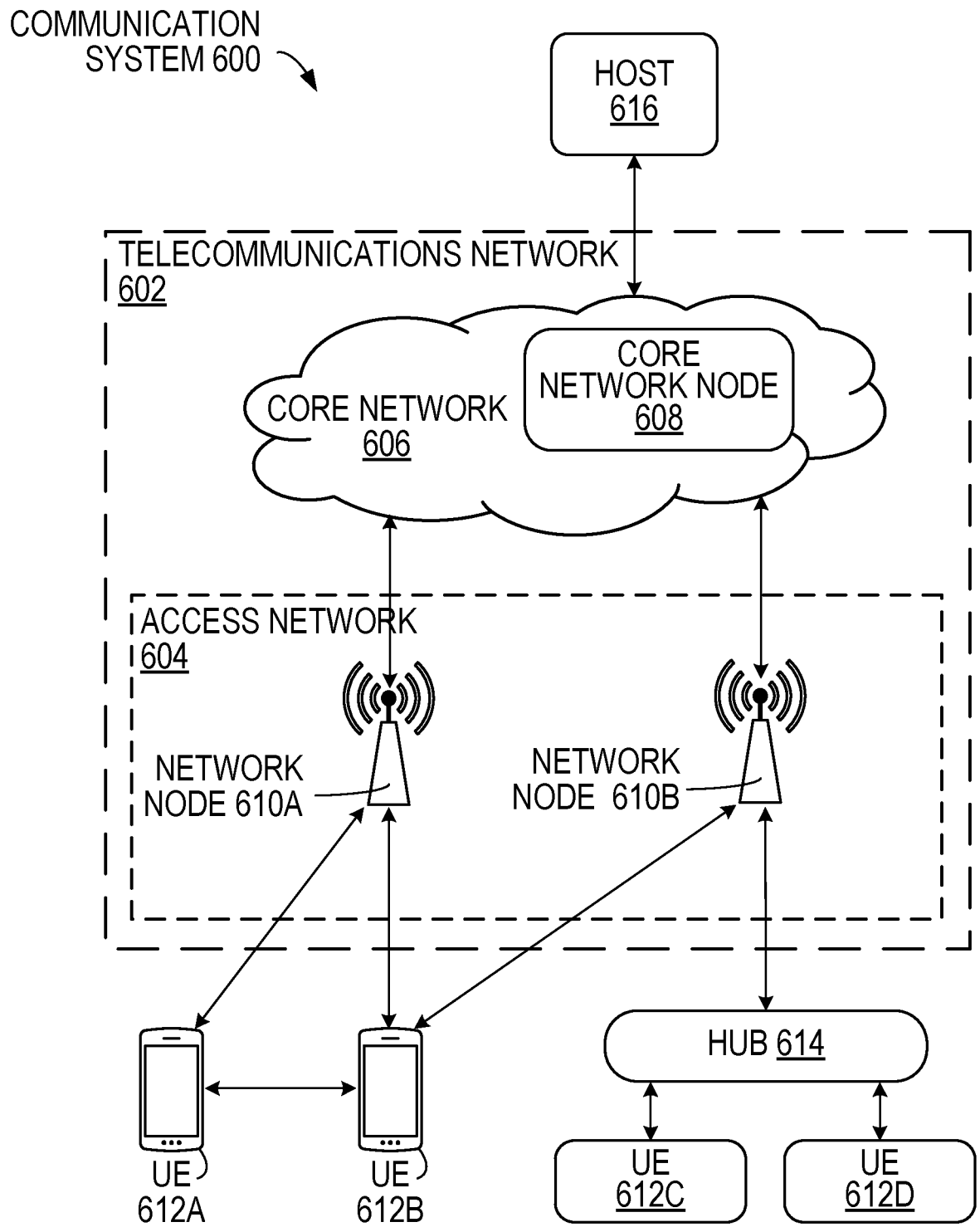
FIG. 6 shows an example of a communication system 600 in accordance with some embodiments.

In this example, the UE AS layer informs the UE NAS layer of the indication that the first request relates to an MPS session so that UE NAS layer can add MPS Access Identity FIG. 6 shows an example of a communication system 600 in accordance with some embodiments.

In the example, the communication system 600 includes a telecommunication network 602 that includes an access network 604, such as a radio access network (RAN), and a core network 606, which includes one or more core network nodes 608. The access network 604 includes one or more access network nodes, such as network nodes 610a and 610b (one or more of which may be generally referred to as network nodes 610), or any other similar 3$^{rd}$ Generation Partnership Project (3GPP) access node or non-3GPP access point. The network nodes 610 facilitate direct or indirect connection of user equipment (UE), such as by connecting UEs 612a, 612b, 612c, and 612d (one or more of which may be generally referred to as UEs 612) to the core network 606 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 600 may include any number of wired or wireless networks, network nodes, UEs, and/or any other components or systems that may facilitate or participate in the communication of data and/or signals whether via wired or wireless connections. The communication system 600 may include and/or interface with any type of communication, telecommunication, data, cellular, radio network, and/or other similar type of system.

The UEs 612 may be any of a wide variety of communication devices, including wireless devices arranged, configured, and/or operable to communicate wirelessly with the network nodes 610 and other communication devices. Similarly, the network nodes 610 are arranged, capable, configured, and/or operable to communicate directly or indirectly with the UEs 612 and/or with other network nodes or equipment in the telecommunication network 602 to enable and/or provide network access, such as wireless network access, and/or to perform other functions, such as administration in the telecommunication network 602.

In the depicted example, the core network 606 connects the network nodes 610 to one or more hosts, such as host 616. These connections may be direct or indirect via one or more intermediary networks or devices. In other examples, network nodes may be directly coupled to hosts. The core network 606 includes one more core network nodes (e.g., core network node 608) that are structured with hardware and software components. Features of these components may be substantially similar to those described with respect to the UEs, network nodes, and/or hosts, such that the descriptions thereof are generally applicable to the corresponding components of the core network node 608. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 616 may be under the ownership or control of a service provider other than an operator or provider of the access network 604 and/or the telecommunication network 602, and may be operated by the service provider or on behalf of the service provider. The host 616 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 600 of FIG. 6 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 602 is a cellular network that implements 3GPP standardized features. Accordingly, the telecommunications network 602 may support network slicing to provide different logical networks to different devices that are connected to the telecommunication network 602. For example, the telecommunications network 602 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 612 are configured to transmit and/or receive information without direct human interaction. For instance, a UE may be designed to transmit information to the access network 604 on a predetermined schedule, when triggered by an internal or external event, or in response to requests from the access network 604. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example illustrated in FIG. 6, the hub 614 communicates with the access network 604 to facilitate indirect communication between one or more UEs (e.g., UE 612c and/or 612d) and network nodes (e.g., network node 610b). In some examples, the hub 614 may be a controller, router, a content source and analytics node, or any of the other communication devices described herein regarding UEs. For example, the hub 614 may be a broadband router enabling access to the core network 606 for the UEs. As another example, the hub 614 may be a controller that sends commands or instructions to one or more actuators in the UEs. Commands or instructions may be received from the UEs, network nodes 610, or by executable code, script, process, or other instructions in the hub 614. As another example, the hub 614 may be a data collector that acts as temporary storage for UE data and, in some embodiments, may perform analysis or other processing of the data. As another example, the hub 614 may be a content source. For example, for a UE that is a VR headset, display, loudspeaker or other media delivery device, the hub 614 may retrieve VR assets, video, audio, or other media or data related to sensory information via a network node, which the hub 614 then provides to the UE either directly, after performing local processing, and/or after adding additional local content. In still another example, the hub 614 acts as a proxy server or orchestrator for the UEs, in particular in if one or more of the UEs are low energy IoT devices.

The hub 614 may have a constant/persistent or intermittent connection to the network node 610*b*. The hub 614 may also allow for a different communication scheme and/or schedule between the hub 614 and UEs (e.g., UE 612*c* and/or 612*d*), and between the hub 614 and the core network 606. In other examples, the hub 614 is connected to the core network 606 and/or one or more UEs via a wired connection. Moreover, the hub 614 may be configured to connect to an M2M service provider over the access network 604 and/or to another UE over a direct connection. In some scenarios, UEs may establish a wireless connection with the network nodes 610 while still connected via the hub 614 via a wired or wireless connection. In some embodiments, the hub 614 may be a dedicated hub—that is, a hub whose primary function is to route communications to/from the UEs from/to the network node 610*b*. In other embodiments, the hub 614 may be a non-dedicated hub—that is, a device which is capable of operating to route communications between the UEs and network node 610*b*, but which is additionally capable of operating as a communication start and/or end point for certain data channels.

Figure 7:
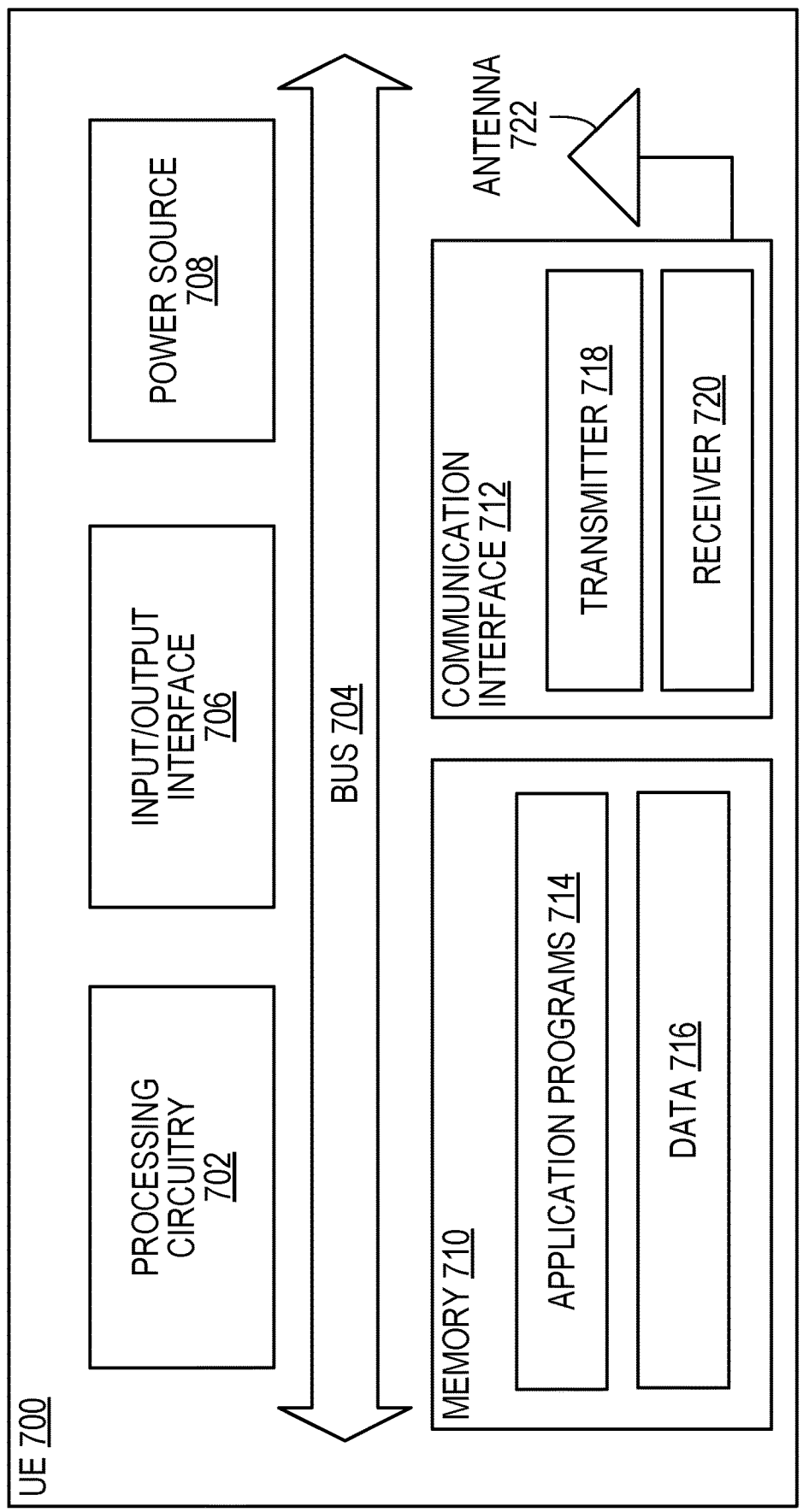
FIG. 7 shows a UE 700 in accordance with some embodiments.

FIG. 7 shows a UE 700 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 700 includes processing circuitry 702 that is operatively coupled via a bus 704 to an input/output interface 706, a power source 708, a memory 710, a communication interface 712, and/or any other component, or any combination thereof. Certain UEs may utilize all or a subset of the components shown in FIG. 7. The level of integration between the components may vary from one UE to another UE. Further, certain UEs may contain multiple instances of a component, such as multiple processors, memories, transceivers, transmitters, receivers, etc.

The processing circuitry 702 is configured to process instructions and data and may be configured to implement any sequential state machine operative to execute instructions stored as machine-readable computer programs in the memory 710. The processing circuitry 702 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 702 may include multiple central processing units (CPUs). The processing circuitry 702 may be operable to provide, either alone or in conjunction with other UE 700 components, such as the memory 710, UE 700 functionality. For example, the processing circuitry 702 may be configured to cause the UE 702 to perform the methods as described with reference to FIG. 2.

In the example, the input/output interface 706 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 700. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 708 is structured as a battery or battery pack. Other types of power sources, such as an external power source (e.g., an electricity outlet), photovoltaic device, or power cell, may be used. The power source 708 may further include power circuitry for delivering power from the power source 708 itself, and/or an external power source, to the various parts of the UE 700 via input circuitry or an interface such as an electrical power cable. Delivering power may be, for example, for charging of the power source 708. Power circuitry may perform any formatting, converting, or other modification to the power from the power source 708 to make the power suitable for the respective components of the UE 700 to which power is supplied.

The memory 710 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 710 includes one or more application programs 714, such as an operating system, web browser application, a widget, gadget engine, or other application, and corresponding data 716. The memory 710 may store, for use by the UE 700, any of a variety of various operating systems or combinations of operating systems.

The memory 710 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 710 may allow the UE 700 to access instructions, application programs and the like, stored on transitory or non-transitory memory media, to off-load data, or to upload data. An article of manufacture, such as one utilizing a communication system may be tangibly embodied as or in the memory 710, which may be or comprise a device-readable storage medium.

The processing circuitry 702 may be configured to communicate with an access network or other network using the communication interface 712. The communication interface 712 may comprise one or more communication subsystems and may include or be communicatively coupled to an antenna 722. The communication interface 712 may include one or more transceivers used to communicate, such as by communicating with one or more remote transceivers of another device capable of wireless communication (e.g., another UE or a network node in an access network). Each transceiver may include a transmitter 718 and/or a receiver 720 appropriate to provide network communications (e.g., optical, electrical, frequency allocations, and so forth). Moreover, the transmitter 718 and receiver 720 may be coupled to one or more antennas (e.g., antenna 722) and may share circuit components, software or firmware, or alternatively be implemented separately.

In some embodiments, communication functions of the communication interface 712 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 712, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 700 shown in FIG. 7.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 8:
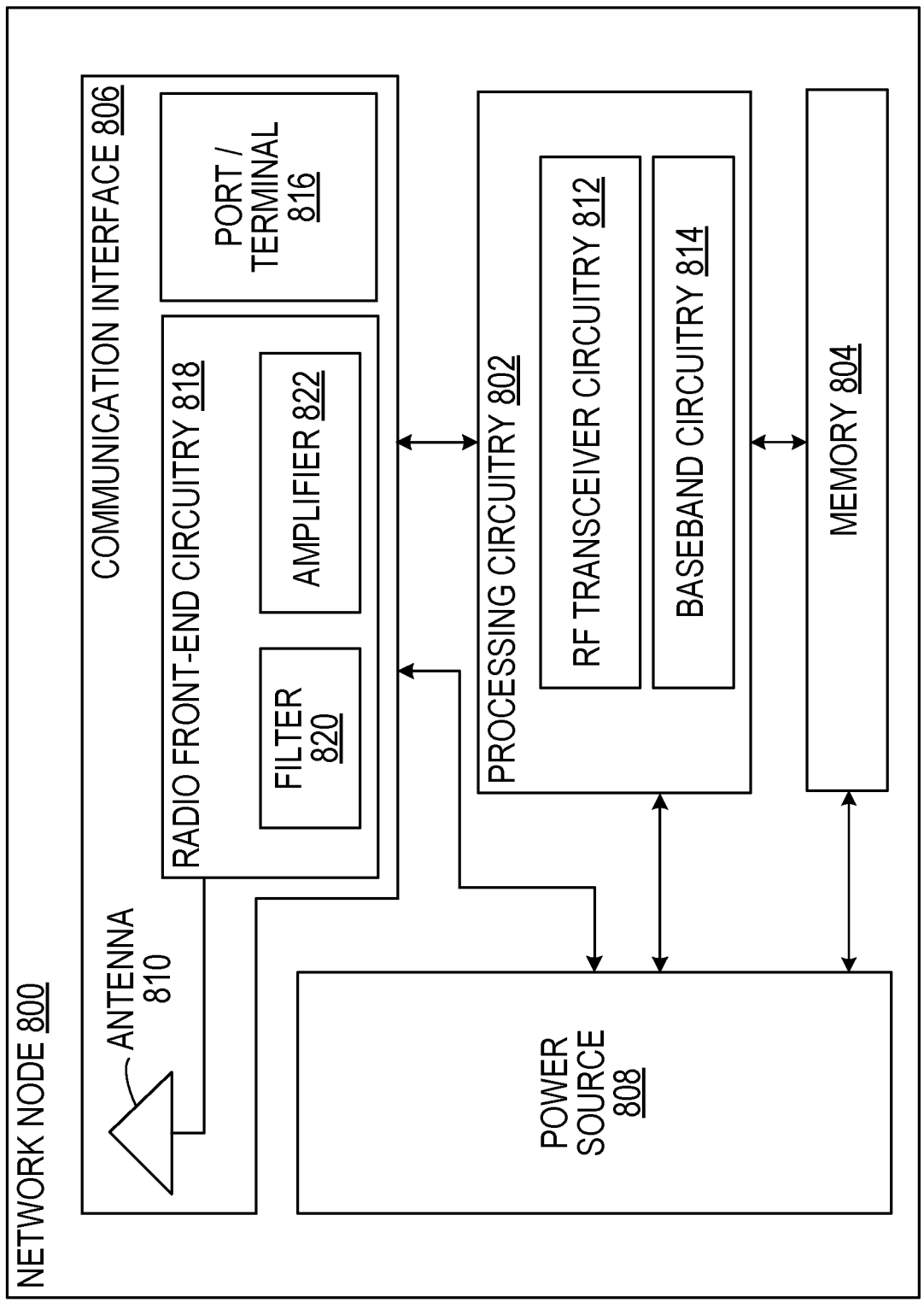
FIG. 8 shows a network node 800 in accordance with some embodiments.

FIG. 8 shows a network node 800 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 800 includes processing circuitry 802, a memory 804, a communication interface 806, and a power source 808, and/or any other component, or any combination thereof. The network node 800 may be composed of multiple physically separate components (e.g., a NodeB component and a RNC component, or a BTS component and a BSC component, etc.), which may each have their own respective components. In certain scenarios in which the network node 800 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 800 may be configured to support multiple radio access technologies (RATs). In such embodiments, some components may be duplicated (e.g., separate memory 804 for different RATs) and some components may be reused (e.g., a same antenna 810 may be shared by different RATs). The network node 800 may also include multiple sets of the various illustrated components for different wireless technologies integrated into network node 800, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 800.

The processing circuitry 802 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 800 components, such as the memory 804, network node 800 functionality. For example, the processing circuitry 802 may be configured to cause the network node to perform the methods as described with reference to FIG. 3 or FIG. 4.

In some embodiments, the processing circuitry 802 includes a system on a chip (SOC). In some embodiments, the processing circuitry 802 includes one or more of radio frequency (RF) transceiver circuitry 812 and baseband processing circuitry 814. In some embodiments, the radio frequency (RF) transceiver circuitry 812 and the baseband processing circuitry 814 may be on separate chips (or sets of chips), boards, or units, such as radio units and digital units. In alternative embodiments, part or all of RF transceiver circuitry 812 and baseband processing circuitry 814 may be on the same chip or set of chips, boards, or units.

The memory 804 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 802. The memory 804 may store any suitable instructions, data, or information, including a computer program, software, an application including one or more of logic, rules, code, tables, and/or other instructions capable of being executed by the processing circuitry 802 and utilized by the network node 800. The memory 804 may be used to store any calculations made by the processing circuitry 802 and/or any data received via the communication interface 806. In some embodiments, the processing circuitry 802 and memory 804 is integrated.

The communication interface 806 is used in wired or wireless communication of signaling and/or data between a network node, access network, and/or UE. As illustrated, the communication interface 806 comprises port(s)/terminal(s) 816 to send and receive data, for example to and from a network over a wired connection. The communication interface 806 also includes radio front-end circuitry 818 that may be coupled to, or in certain embodiments a part of, the antenna 810. Radio front-end circuitry 818 comprises filters 820 and amplifiers 822. The radio front-end circuitry 818 may be connected to an antenna 810 and processing circuitry 802. The radio front-end circuitry may be configured to condition signals communicated between antenna 810 and processing circuitry 802. The radio front-end circuitry 818 may receive digital data that is to be sent out to other network nodes or UEs via a wireless connection. The radio front-end circuitry 818 may convert the digital data into a radio signal having the appropriate channel and bandwidth parameters using a combination of filters 820 and/or amplifiers 822. The radio signal may then be transmitted via the antenna 810. Similarly, when receiving data, the antenna 810 may collect radio signals which are then converted into digital data by the radio front-end circuitry 818. The digital data may be passed to the processing circuitry 802. In other embodiments, the communication interface may comprise different components and/or different combinations of components.

In certain alternative embodiments, the network node 800 does not include separate radio front-end circuitry 818, instead, the processing circuitry 802 includes radio front-end circuitry and is connected to the antenna 810. Similarly, in some embodiments, all or some of the RF transceiver circuitry 812 is part of the communication interface 806. In still other embodiments, the communication interface 806 includes one or more ports or terminals 816, the radio front-end circuitry 818, and the RF transceiver circuitry 812, as part of a radio unit (not shown), and the communication interface 806 communicates with the baseband processing circuitry 814, which is part of a digital unit (not shown).

The antenna 810 may include one or more antennas, or antenna arrays, configured to send and/or receive wireless signals. The antenna 810 may be coupled to the radio front-end circuitry 818 and may be any type of antenna capable of transmitting and receiving data and/or signals wirelessly. In certain embodiments, the antenna 810 is separate from the network node 800 and connectable to the network node 800 through an interface or port.

The antenna 810, communication interface 806, and/or the processing circuitry 802 may be configured to perform any receiving operations and/or certain obtaining operations described herein as being performed by the network node. Any information, data and/or signals may be received from a UE, another network node and/or any other network equipment. Similarly, the antenna 810, the communication interface 806, and/or the processing circuitry 802 may be configured to perform any transmitting operations described herein as being performed by the network node. Any information, data and/or signals may be transmitted to a UE, another network node and/or any other network equipment.

The power source 808 provides power to the various components of network node 800 in a form suitable for the respective components (e.g., at a voltage and current level needed for each respective component). The power source 808 may further comprise, or be coupled to, power management circuitry to supply the components of the network node 800 with power for performing the functionality described herein. For example, the network node 800 may be connectable to an external power source (e.g., the power grid, an electricity outlet) via an input circuitry or interface such as an electrical cable, whereby the external power source supplies power to power circuitry of the power source 808. As a further example, the power source 808 may comprise a source of power in the form of a battery or battery pack which is connected to, or integrated in, power circuitry. The battery may provide backup power should the external power source fail.

Embodiments of the network node 800 may include additional components beyond those shown in FIG. 8 for providing certain aspects of the network node's functionality, including any of the functionality described herein and/or any functionality necessary to support the subject matter described herein. For example, the network node 800 may include user interface equipment to allow input of information into the network node 800 and to allow output of information from the network node 800. This may allow a user to perform diagnostic, maintenance, repair, and other administrative functions for the network node 800.

Figure 9:
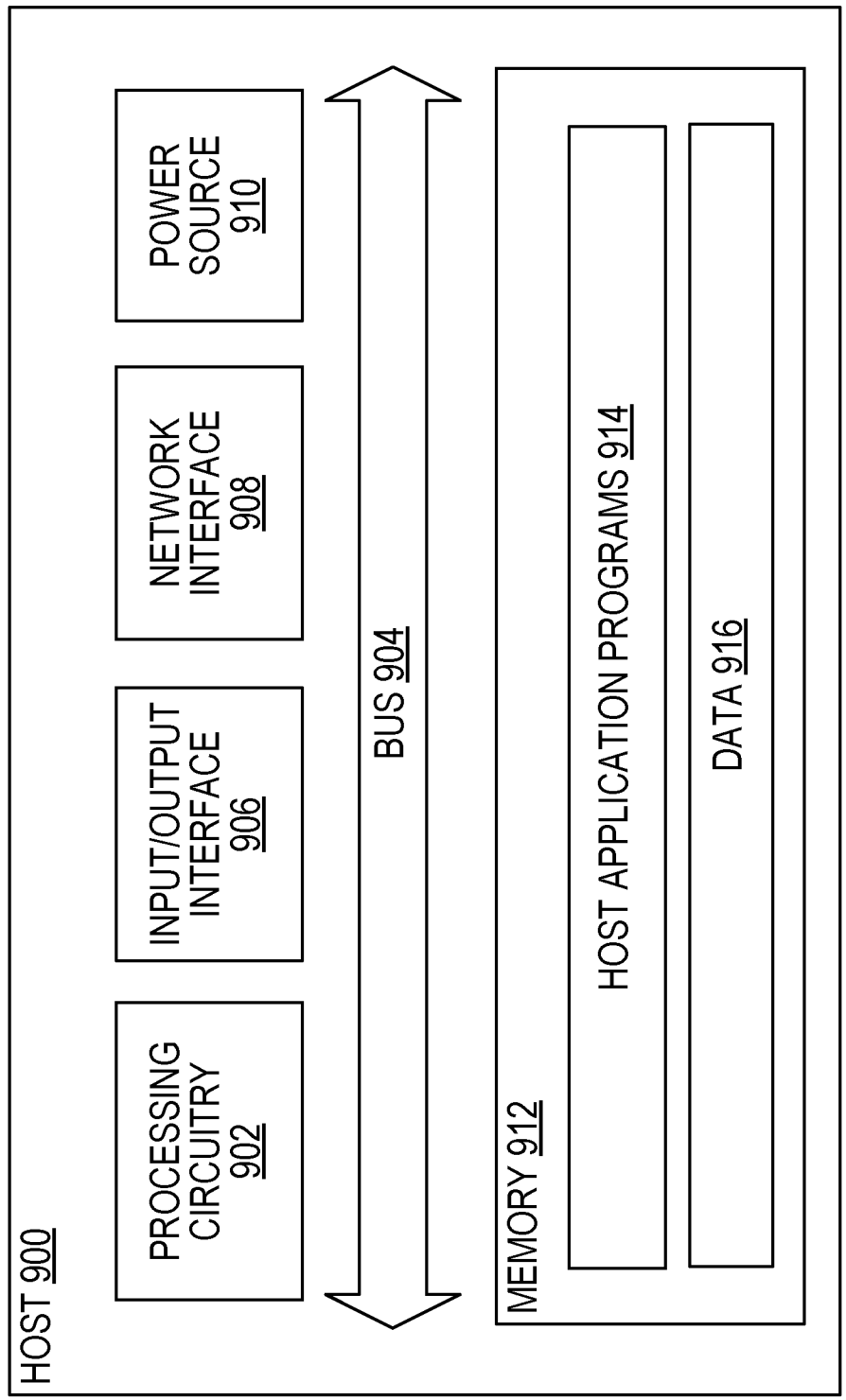
FIG. 9 is a block diagram of a host 900, which may be an embodiment of the host 616 of FIG. 6, in accordance with various aspects described herein.

FIG. 9 is a block diagram of a host 900, which may be an embodiment of the host 616 of FIG. 6, in accordance with various aspects described herein. As used herein, the host 900 may be or comprise various combinations hardware and/or software, including a standalone server, a blade server, a cloud-implemented server, a distributed server, a virtual machine, container, or processing resources in a server farm. The host 900 may provide one or more services to one or more UEs.

The host 900 includes processing circuitry 902 that is operatively coupled via a bus 904 to an input/output interface 906, a network interface 908, a power source 910, and a memory 912. Other components may be included in other embodiments. Features of these components may be substantially similar to those described with respect to the devices of previous figures, such as FIGS. 7 and 8, such that the descriptions thereof are generally applicable to the corresponding components of host 900.

The memory 912 may include one or more computer programs including one or more host application programs 914 and data 916, which may include user data, e.g., data generated by a UE for the host 900 or data generated by the host 900 for a UE. Embodiments of the host 900 may utilize only a subset or all of the components shown. The host application programs 914 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 914 may also provide for user authentication and licensing checks and may periodically report health, routes, and content availability to a central node, such as a device in or on the edge of a core network. Accordingly, the host 900 may select and/or indicate a different host for over-the-top services for a UE. The host application programs 914 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 10:
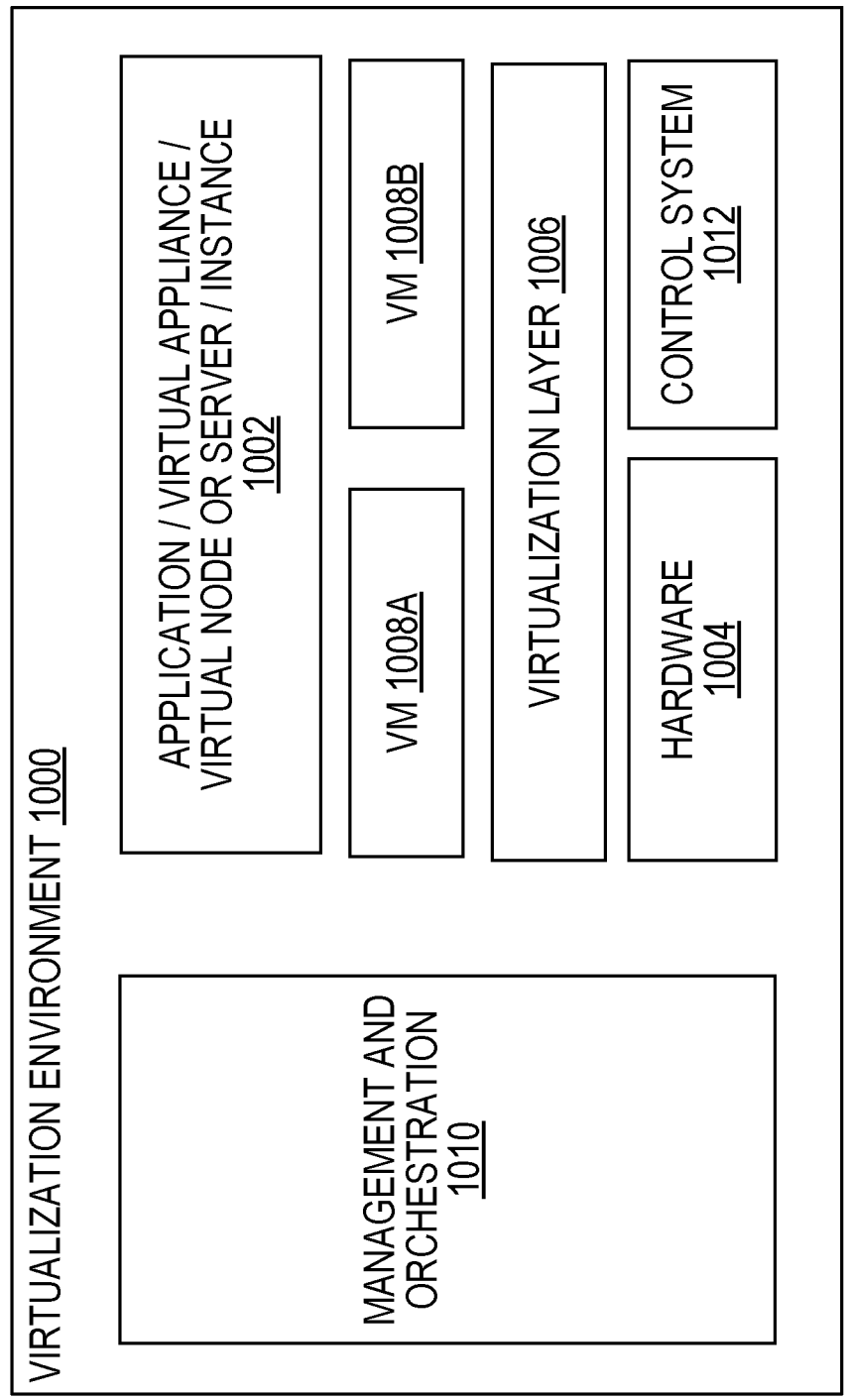
FIG. 10 is a block diagram illustrating a virtualization environment 1000 in which functions implemented by some embodiments may be virtualized.

FIG. 10 is a block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1000 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1002 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1004 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1006 (also referred to as hypervisors or virtual machine monitors (VMMs)), provide VMs 1008a and 1008b (one or more of which may be generally referred to as VMs 1008), and/or perform any of the functions, features and/or benefits described in relation with some embodiments described herein. The virtualization layer 1006 may present a virtual operating platform that appears like networking hardware to the VMs 1008.

The VMs 1008 comprise virtual processing, virtual memory, virtual networking or interface and virtual storage, and may be run by a corresponding virtualization layer 1006. Different embodiments of the instance of a virtual appliance 1002 may be implemented on one or more of VMs 1008, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1008 may be a software implementation of a physical machine that runs programs as if they were executing on a physical, non-virtualized machine. Each of the VMs 1008, and that part of hardware 1004 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1008 on top of the hardware 1004 and corresponds to the application 1002.

Hardware 1004 may be implemented in a standalone network node with generic or specific components. Hardware 1004 may implement some functions via virtualization. Alternatively, hardware 1004 may be part of a larger cluster of hardware (e.g. such as in a data center or CPE) where many hardware nodes work together and are managed via management and orchestration 1010, which, among others, oversees lifecycle management of applications 1002. In some embodiments, hardware 1004 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1012 which may alternatively be used for communication between hardware nodes and radio units.

Figure 11:
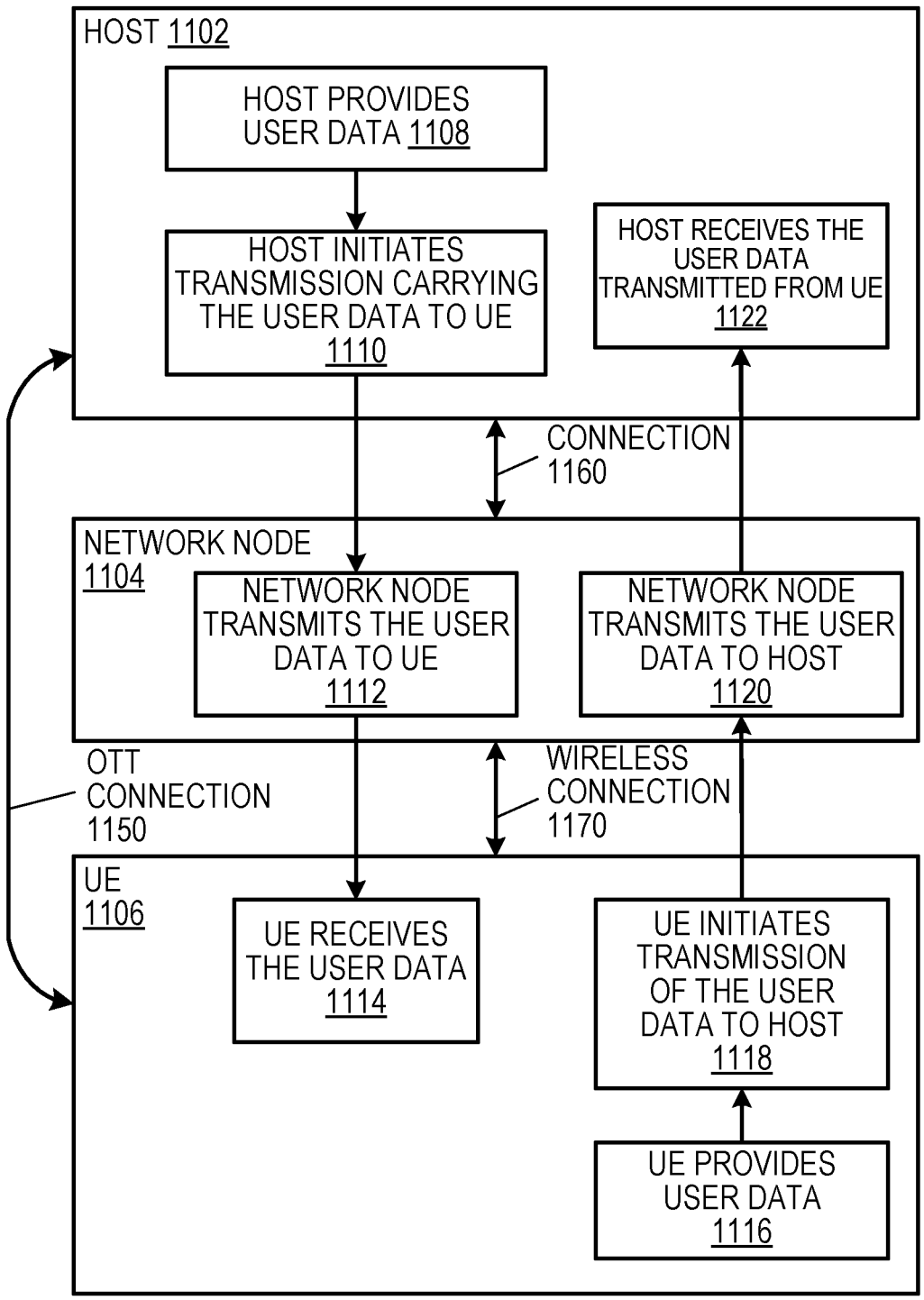
FIG. 11 shows a communication diagram of a host 1102 communicating via a network node 1104 with a UE 1106 over a partially wireless connection in accordance with some embodiments.

FIG. 11 shows a communication diagram of a host 1102 communicating via a network node 1104 with a UE 1106 over a partially wireless connection in accordance with some embodiments. Example implementations, in accordance with various embodiments, of the UE (such as a UE 612*a* of FIG. 6 and/or UE 700 of FIG. 7), network node (such as network node 610*a* of FIG. 6 and/or network node 800 of FIG. 8), and host (such as host 616 of FIG. 6 and/or host 900 of FIG. 9) discussed in the preceding paragraphs will now be described with reference to FIG. 11.

Like host 900, embodiments of host 1102 include hardware, such as a communication interface, processing circuitry, and memory. The host 1102 also includes software, which is stored in or accessible by the host 1102 and executable by the processing circuitry. The software includes a host application that may be operable to provide a service to a remote user, such as the UE 1106 connecting via an over-the-top (OTT) connection 1150 extending between the UE 1106 and host 1102. In providing the service to the remote user, a host application may provide user data which is transmitted using the OTT connection 1150.

The network node 1104 includes hardware enabling it to communicate with the host 1102 and UE 1106. The connection 1160 may be direct or pass through a core network (like core network 606 of FIG. 6) and/or one or more other intermediate networks, such as one or more public, private, or hosted networks. For example, an intermediate network may be a backbone network or the Internet.

The UE 1106 includes hardware and software, which is stored in or accessible by UE 1106 and executable by the UE's processing circuitry. The software includes a client application, such as a web browser or operator-specific "app" that may be operable to provide a service to a human or non-human user via UE 1106 with the support of the host 1102. In the host 1102, an executing host application may communicate with the executing client application via the OTT connection 1150 terminating at the UE 1106 and host 1102. In providing the service to the user, the UE's client application may receive request data from the host's host application and provide user data in response to the request data. The OTT connection 1150 may transfer both the request data and the user data. The UE's client application may interact with the user to generate the user data that it provides to the host application through the OTT connection 1150.

The OTT connection 1150 may extend via a connection 1160 between the host 1102 and the network node 1104 and via a wireless connection 1170 between the network node 1104 and the UE 1106 to provide the connection between the host 1102 and the UE 1106. The connection 1160 and wireless connection 1170, over which the OTT connection 1150 may be provided, have been drawn abstractly to illustrate the communication between the host 1102 and the UE 1106 via the network node 1104, without explicit reference to any intermediary devices and the precise routing of messages via these devices.

As an example of transmitting data via the OTT connection 1150, in step 1108, the host 1102 provides user data, which may be performed by executing a host application. In some embodiments, the user data is associated with a particular human user interacting with the UE 1106. In other embodiments, the user data is associated with a UE 1106 that shares data with the host 1102 without explicit human interaction. In step 1110, the host 1102 initiates a transmission carrying the user data towards the UE 1106. The host 1102 may initiate the transmission responsive to a request transmitted by the UE 1106. The request may be caused by human interaction with the UE 1106 or by operation of the client application executing on the UE 1106. The transmission may pass via the network node 1104, in accordance with the teachings of the embodiments described throughout this disclosure. Accordingly, in step 1112, the network node 1104 transmits to the UE 1106 the user data that was carried in the transmission that the host 1102 initiated, in accordance with the teachings of the embodiments described throughout this disclosure. In step 1114, the UE 1106 receives the user data carried in the transmission, which may be performed by a client application executed on the UE 1106 associated with the host application executed by the host 1102.

In some examples, the UE 1106 executes a client application which provides user data to the host 1102. The user data may be provided in reaction or response to the data received from the host 1102. Accordingly, in step 1116, the UE 1106 may provide user data, which may be performed by executing the client application. In providing the user data, the client application may further consider user input received from the user via an input/output interface of the UE 1106. Regardless of the specific manner in which the user data was provided, the UE 1106 initiates, in step 1118, transmission of the user data towards the host 1102 via the network node 1104. In step 1120, in accordance with the teachings of the embodiments described throughout this disclosure, the network node 1104 receives user data from the UE 1106 and initiates transmission of the received user data towards the host 1102. In step 1122, the host 1102 receives the user data carried in the transmission initiated by the UE 1106.

One or more of the various embodiments improve the performance of OTT services provided to the UE 1106 using the OTT connection 1150, in which the wireless connection 1170 forms the last segment. More precisely, the teachings of these embodiments may improve the latency of MPS session establishment and thereby provide benefits such as better responsiveness to MPS sessions.

In an example scenario, factory status information may be collected and analyzed by the host 1102. As another example, the host 1102 may process audio and video data which may have been retrieved from a UE for use in creating maps. As another example, the host 1102 may collect and analyze real-time data to assist in controlling vehicle congestion (e.g., controlling traffic lights). As another example, the host 1102 may store surveillance video uploaded by a UE. As another example, the host 1102 may store or control access to media content such as video, audio, VR or AR which it can broadcast, multicast or unicast to UEs. As other examples, the host 1102 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1150 between the host 1102 and UE 1106, in response to variations in the measurement results. The measurement procedure and/or the network functionality for reconfiguring the OTT connection may be implemented in software and hardware of the host 1102 and/or UE 1106. In some embodiments, sensors (not shown) may be deployed in or in association with other devices through which the OTT connection 1150 passes; the sensors may participate in the measurement procedure by supplying values of the monitored quantities exemplified above, or supplying values of other physical quantities from which software may compute or estimate the monitored quantities. The reconfiguring of the OTT connection 1150 may include message format, retransmission settings, preferred routing etc.; the reconfiguring need not directly alter the operation of the network node 1104. Such procedures and functionalities may be known and practiced in the art. In certain embodiments, measurements may involve proprietary UE signaling that facilitates measurements of throughput, propagation times, latency and the like, by the host 1102. The measurements may be implemented in that software causes messages to be transmitted, in particular empty or 'dummy' messages, using the OTT connection 1150 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The following statements set out some embodiments of the disclosure:

Group A Embodiments

1. A method performed by a user equipment, UE, in connection with a first network node in a first cell, the method comprising:
    receiving a first request from the first network node in the first cell redirecting the UE to an indicated carrier or radio access technology, RAT, wherein the first request comprises: an indication that the UE should enter an inactive state, and an indication that the first request relates to an MPS session; and
    responsive to receiving the first request:
        entering an inactive state;
        selecting a second cell on the indicated carrier or RAT; and
        resuming a connection for the MPS session on the second cell, wherein the connection is resumed with priority.

2. The method of embodiment 1 wherein resuming the connection comprises: transmitting a second request to resume connection to a second network node belonging to the second cell, wherein the second request comprises an indication that second request relates to an MPS session
3. The method of embodiment 1 or 2 wherein the step of resuming the connection comprises skipping an access barring check.
4. The method of embodiment 3 wherein the step of skipping the access barring check comprises:
   adding an MPS access Identity to a set of access identities;
   checking if each of the set of access identities is subject to access barring in a bitmap broadcasted by the second base station; and
   responsive to the MPS access identity not being subject to access barring, skipping the access barring check.
5. The method of embodiment 4 wherein the step of adding an MPS access identity to a set of access identities comprises:
   an Access Stratum, AS, layer in the UE adding the MPS access identity to the set of access identities, wherein the set of access identities is received from at the AS layer from a Non-Access Stratum, NAS layer of the UE.
6. The method of embodiment 4 wherein the step of adding an MPS access identity to a set of access identities comprises:
   an Access Stratum, AS, layer in the UE sending the indication that first request relates to an MPS session to a Non-Access Stratum, NAS, layer of the UE; and
   responsive to receiving the indication that the MPS session is an MPS session, the NAS layer of the UE adding the MPS access identity to the set of access identities.
7. The method of any of the previous embodiments, further comprising:
   providing user data; and
   forwarding the user data to a host via the transmission to the second network node.

Group B Embodiments

8. A method performed by a first network node in a first cell, wherein the first network node is in connection with a user equipment, UE, the method comprising:
   transmitting a first request to the UE redirecting the UE to an indicated carrier or radio access technology, RAT, wherein the first request comprises: an indication that the UE should enter an inactive state, and an indication that first request relates to an MPS session.
9. A method performed by a second network node for resuming a connection to a user equipment, UE, the method comprising:
   receiving a second request from the UE, wherein the UE is in an inactive state, to resume the connection, wherein the second request comprises an indication that the second request relates to an MPS session; and
   prioritizing the connection responsive to the second request comprising the indication that second request relates to an MPS session.

10. The method of any of the previous embodiments, further comprising:
    obtaining user data; and
    forwarding the user data to a host or a user equipment.

Group C Embodiments

11. A user equipment, UE, in connection with a first network node in a first cell comprising:
    processing circuitry configured to cause the user equipment to perform any of the steps of any of the Group A embodiments; and
    power supply circuitry configured to supply power to the processing circuitry.
12. A network node, the network node comprising:
    processing circuitry configured to cause the network node to perform any of the steps of any of the Group B embodiments;
    power supply circuitry configured to supply power to the processing circuitry.
13. A user equipment (UE) in connection with a first network node in a first cell, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
14. A host configured to operate in a communication system to provide an over-the-top (OTT) service, the host comprising:
    processing circuitry configured to provide user data; and
    a network interface configured to initiate transmission of the user data to a cellular network for transmission to a user equipment (UE),
    wherein the UE comprises a communication interface and processing circuitry, the communication interface and processing circuitry of the UE being configured to perform any of the steps of any of the Group A embodiments to receive the user data from the host.
15. The host of the previous embodiment, wherein the cellular network further includes a network node configured to communicate with the UE to transmit the user data to the UE from the host.
16. The host of the previous 2 embodiments, wherein:
    the processing circuitry of the host is configured to execute a host application, thereby providing the user data; and
    the host application is configured to interact with a client application executing on the UE, the client application being associated with the host application.

17. A method implemented by a host operating in a communication system that further includes a network node and a user equipment (UE), the method comprising:
   providing user data for the UE; and
   initiating a transmission carrying the user data to the UE via a cellular network comprising the network node, wherein the UE performs any of the operations of any of the Group A embodiments to receive the user data from the host.
18. The method of the previous embodiment, further comprising:
   at the host, executing a host application associated with a client application executing on the UE to receive the user data from the UE.
19. The method of the previous embodiment, further comprising:
   at the host, transmitting input data to the client application executing on the UE, the input data being provided by executing the host application,
   wherein the user data is provided by the client application in response to the input data from the host application.
20. A host configured to operate in a communication system to provide an over-the-top (OTT) service, the host comprising:
   processing circuitry configured to provide user data; and
   a network interface configured to initiate transmission of the user data to a cellular network for transmission to a user equipment (UE),
   wherein the UE comprises a communication interface and processing circuitry, the communication interface and processing circuitry of the UE being configured to perform any of the steps of any of the Group A embodiments to transmit the user data to the host.
21. The host of the previous embodiment, wherein the cellular network further includes a network node configured to communicate with the UE to transmit the user data from the UE to the host.
22. The host of the previous 2 embodiments, wherein:
   the processing circuitry of the host is configured to execute a host application, thereby providing the user data; and
   the host application is configured to interact with a client application executing on the UE, the client application being associated with the host application.
23. A method implemented by a host configured to operate in a communication system that further includes a network node and a user equipment (UE), the method comprising:
   at the host, receiving user data transmitted to the host via the network node by the UE, wherein the UE performs any of the steps of any of the Group A embodiments to transmit the user data to the host.
24. The method of the previous embodiment, further comprising:
   at the host, executing a host application associated with a client application executing on the UE to receive the user data from the UE.
25. The method of the previous embodiment, further comprising:
   at the host, transmitting input data to the client application executing on the UE, the input data being provided by executing the host application,
   wherein the user data is provided by the client application in response to the input data from the host application.
26. A host configured to operate in a communication system to provide an over-the-top (OTT) service, the host comprising:
   processing circuitry configured to provide user data; and
   a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.
27. The host of the previous embodiment, wherein:
   the processing circuitry of the host is configured to execute a host application that provides the user data; and
   the UE comprises processing circuitry configured to execute a client application associated with the host application to receive the transmission of user data from the host.
28. A method implemented in a host configured to operate in a communication system that further includes a network node and a user equipment (UE), the method comprising:
   providing user data for the UE; and
   initiating a transmission carrying the user data to the UE via a cellular network comprising the network node, wherein the network node performs any of the operations of any of the Group B embodiments to transmit the user data from the host to the UE.
29. The method of the previous embodiment, further comprising, at the network node, transmitting the user data provided by the host for the UE.
30. The method of any of the previous 2 embodiments, wherein the user data is provided at the host by executing a host application that interacts with a client application executing on the UE, the client application being associated with the host application.
31. A communication system configured to provide an over-the-top service, the communication system comprising:
   a host comprising:
   processing circuitry configured to provide user data for a user equipment (UE), the user data being associated with the over-the-top service; and
   a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.
32. The communication system of the previous embodiment, further comprising:
   the network node; and/or
   the user equipment.
33. A host configured to operate in a communication system to provide an over-the-top (OTT) service, the host comprising:
   processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

34. The host of the previous 2 embodiments, wherein:
the processing circuitry of the host is configured to execute a host application, thereby providing the user data; and
the host application is configured to interact with a client application executing on the UE, the client application being associated with the host application.

35. The host of the any of the previous 2 embodiments, wherein the initiating receipt of the user data comprises requesting the user data.

36. A method implemented by a host configured to operate in a communication system that further includes a network node and a user equipment (UE), the method comprising:
at the host, initiating receipt of user data from the UE, the user data originating from a transmission which the network node has received from the UE, wherein the network node performs any of the steps of any of the Group B embodiments to receive the user data from the UE for the host.

37. The method of the previous embodiment, further comprising at the network node, transmitting the received user data to the host.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
5GC 5G core
AS Access Stratum
eNB Evolved Node B (A radio base station supporting the LTE air interface)
gNB 5G Node B (A radio base station supporting the NR air interface)
LTE Long Term Evolution
MPS Multimedia Priority Services
ng-eNB Next Generation eNB (A radio base station in LTE connected to 5GC)
NAS Non Access Stratum
NR New Radio
RAT Radio Access Technology
RRC Radio Resource Control
TS Technical Specification
UAC Unified Access Control
UE User Equipment
1×RTT CDMA2000 1×Radio Transmission Technology
3GPP 3rd Generation Partnership Project
5G 5th Generation
6G 6th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
USIM Universal Subscriber Identity Module
UTDOA Uplink Time Difference of Arrival
WCDMA Wide CDMA
WLAN Wide Local Area Network

The invention claimed is:

1. A method performed by a user equipment (UE) in connection with a first network node in a first cell, the method comprising:
receiving a first request from the first network node in the first cell redirecting the UE to an indicated carrier or radio access technology (RAT), wherein the first request comprises: an indication that the UE should enter an inactive state, and an indication that the first request relates to a Multimedia Priority Services (MPS) session; and
responsive to receiving the first request:
entering an inactive state;
selecting a second cell on the indicated carrier or RAT; and
resuming a connection for the MPS session on the second cell, wherein the connection is resumed with priority,
wherein the step of resuming the connection comprises skipping an access barring check;
wherein the step of skipping the access barring check comprises:
adding an MPS access identity to a set of access identities;
checking if each of the set of access identities is subject to access barring in a bitmap broadcasted by the second base station; and
responsive to the MPS access identity not being subject to access barring, skipping the access barring check.

2. The method of claim 1, wherein resuming the connection comprises: transmitting a second request to resume connection to a second network node belonging to the second cell, wherein the second request comprises an indication that second request relates to an MPS session.

3. The method of claim 1, wherein the step of adding an MPS access identity to a set of access identities comprises:
an Access Stratum (AS) layer in the UE adding the MPS access identity to the set of access identities, wherein the set of access identities is received at the AS layer from a Non-Access Stratum (NAS) layer of the UE.

4. A user equipment (UE), the UE comprising:
processing circuitry configured to cause the user equipment to:
receive a first request from a first network node in a first cell redirecting the UE to an indicated carrier or radio access technology (RAT), wherein the UE is in connection with the first network node in the first cell, and wherein the first request comprises:
an indication that the UE should enter an inactive state, and an indication that the first request relates to a Multimedia Priority Services (MPS) session; and
responsive to receiving the first request:
enter an inactive state;
select a second cell on the indicated carrier or RAT; and
resume a connection for the MPS session on the second cell, wherein the connection is resumed with priority,
wherein the processing circuitry is configured to cause the UE to resume the connection, including skipping an access barring check,
wherein the processing circuitry is configured to cause the UE to skip the access barring check by:
adding an MPS access identity to a set of access identities;
checking if each of the set of access identities is subject to access barring in a bitmap broadcasted by the second base station; and
responsive to the MPS access identity not being subject to access barring, skipping the access barring check.

5. The UE of claim 4, wherein the processing circuitry is configured to cause the UE to resume the connection by: transmitting a second request to resume connection to a second network node belonging to the second cell, wherein the second request comprises an indication that second request relates to an MPS session.

6. The UE of claim 4, wherein the processing circuitry is configured to cause the UE to add an MPS access identity to a set of access identities by:
adding, at an Access Stratum (AS) layer in the UE, the MPS access identity to the set of access identities, wherein the set of access identities is received at the AS layer from a Non-Access Stratum (NAS) layer of the UE.

* * * * *